(12) United States Patent
Ejiri (10) Patent No.: US 6,347,098 B1
(45) Date of Patent: Feb. 12, 2002

(54) PACKET MULTIPLEXING APPARATUS WITH LESS MULTIPLEXING DELAY (75) Inventor: Satoru Ejiri, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/122,638

(22) Filed: Jul. 27, 1998

(30) Foreign Application Priority Data

Jul. 31, 1997 (JP) .............................................. 9-206441

(51) Int. Cl.[7] .................................................. H04J 3/04
(52) U.S. Cl. ........................................ 370/532; 370/537
(58) Field of Search ................................. 370/474, 412, 370/395, 392, 378, 543, 394, 516, 532, 449, 451, 517, 514, 510, 509, 538

(56) References Cited

U.S. PATENT DOCUMENTS 6,181,712 B1 * 1/2001 Rosengren .................. 370/474

FOREIGN PATENT DOCUMENTS

| JP | 1-198142 | 8/1989 |
| JP | 1-295546 | 11/1989 |
| JP | 3-104453 | 5/1991 |
| JP | 3-106149 | 5/1991 |
| JP | 3-109841 | 5/1991 |
| JP | 4-348636 | 12/1992 |
| JP | 7-226773 | 8/1995 |
| JP | 8-274813 | 10/1996 |

* cited by examiner

Primary Examiner—Douglas Olms
Assistant Examiner—Ricardo M. Pizarro
(74) Attorney, Agent, or Firm—Young & Thompson

(57) ABSTRACT

A packet multiplexing apparatus includes at least one high transmission rate data memory for accumulating high transmission rate data, and at least one low transmission rate data memory for accumulating low transmission rate data. A control section determines whether an accumulation quantity of the high transmission rate data reaches a first predetermined value, and issues a transmission instruction when it is determined that the accumulation quantity of the high transmission rate data reaches the first predetermined value. A multiplexing unit multiplexes the high transmission rate data from the high transmission rate data memory and the low transmission rate data from the low transmission rate data memory in response to the transmission instruction to form a packet.

17 Claims, 6 Drawing Sheets

IN CASE OF HSD DATA:LSD DATA=5:1

Fig. 6B

IN CASE OF HSD DATA:LSD DATA=1:1

Fig. 7

PACKET MULTIPLEXING APPARATUS WITH LESS MULTIPLEXING DELAY

BACKGROUND OF THE INVENTION

1. Field of the Invention

The present invention relates to a packet multiplexing apparatus and a method of forming a packet in a packet multiplexing apparatus.

2. Description of the Related Art

In a conventional example of a packet multiplexing apparatus, when a digital video and audio data of high quality, a high transmission rate general-purpose data, and a plurality of low transmission rate general-purpose data are multiplexed in a packet having a fixed length, the TS multiplexing (transport stream multiplexing) of the MPEG2 system is adopted. The general purpose data may include a video data and a speech data in addition to character data and so on.

Figure 1:
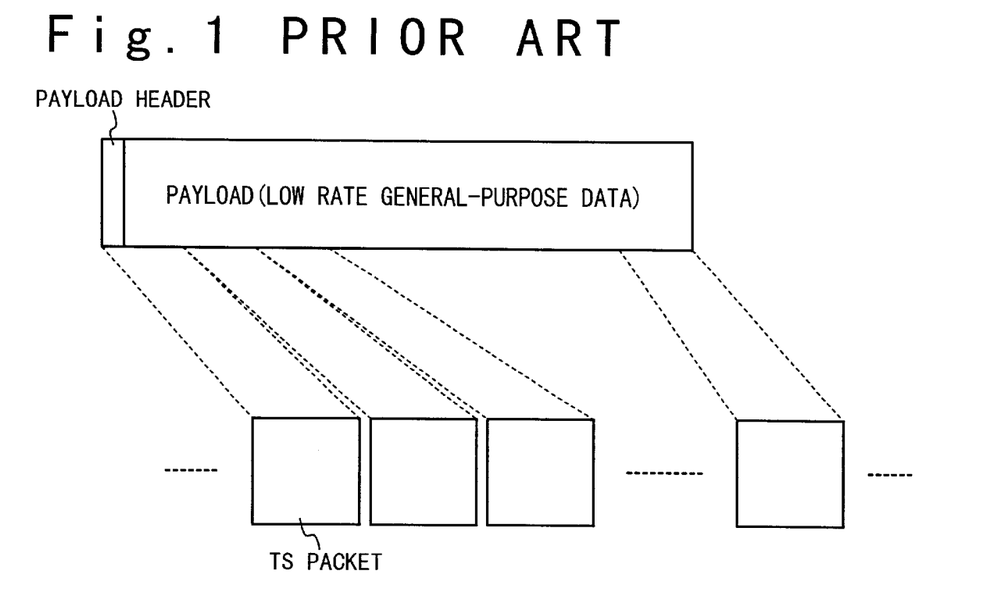
FIG. 1 is a diagram illustrating the cutting-off of a low transmission rate data in a payload onto TS packets in a conventional example of a packet multiplexing apparatus.

FIG. 1 shows the payload and the TS packets. Referring to FIG. 1, the low transmission rate general-purpose data is converted into packets and is put on a payload section of each of private PES packets which can be freely used by a user. The data is divided and put on the TS packets. Each of the TS packets has the fixed length and is added with an identifier which indicates that the packet is the privacy PES packet. Then, the TS packets are transmitted onto a network.

Thus, in the conventional example of the packet multiplexing apparatus, each of the general-purpose data is divided into the payload section of the packets which has the identifier corresponding to the general-purpose data and then transmitted onto the network.

Also, because the above digital video and audio data have a high transmission rate, it is important that the video and audio data are transmitted at real time. In this case, the packet length of the above TS packet is set to be comparatively long.

Figures 2A, 2B:
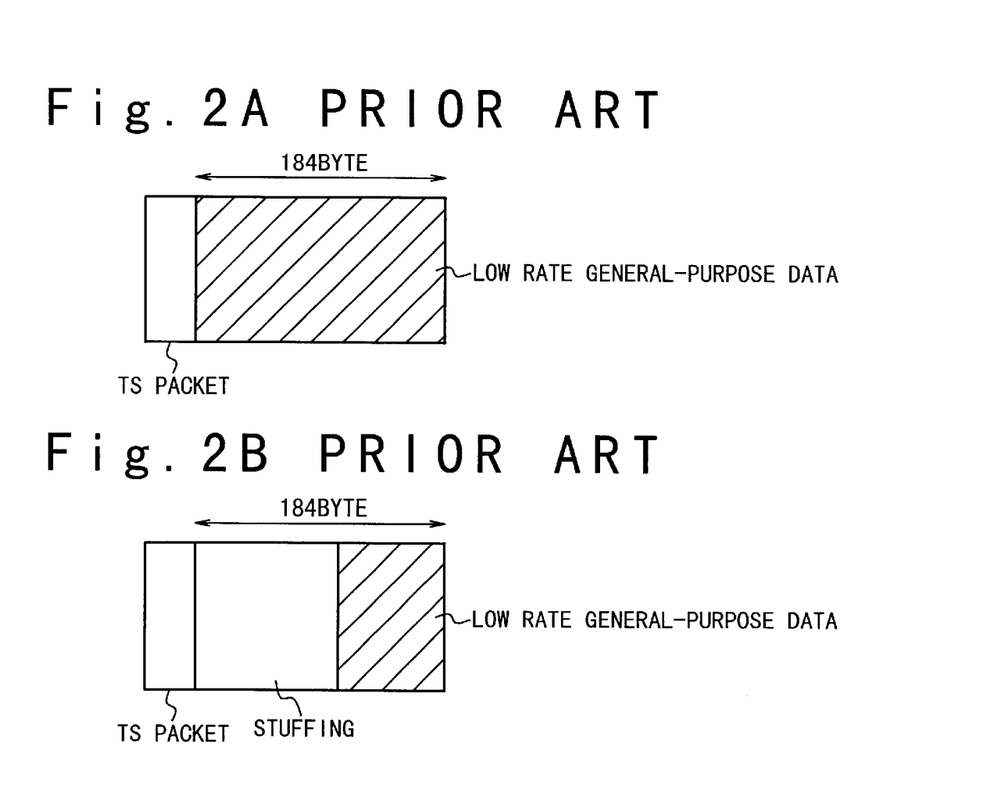
FIGS. 2A and 2B are diagrams illustrating formats in which a low transmission rate data is put on TS packet payloads with no stuffing area and with a stuffing area, respectively.

In the above-mentioned conventional example of the packet multiplexing apparatus, when the above low transmission rate general-purpose data to be converted into packets, a long time is required until the data for the payload length of the TS packet is stored in a memory. As a result, the delay between communication ends is large. For instance, in the TS multiplexing in the MPEG2 system, when the low transmission rate data of 1200 bits/sec is put on the payload section of 184 bytes without any stuffing, as shown in FIG. 2A, about 1.2 seconds is required to convert into the packets. On the other hand, if a stuffing area is provided for the payload section of the fixed length packet to reduce this delay, as shown in FIG. 2B, the transmission efficiency is decreased by the stuffing area.

A TDM-packet converting circuit is described in Japanese Laid Open Patent Application (JP-A-Heisei 3-106149). In this reference, there are provided a 2-plane buffer having a storage area for each of channel numbers and a TDM control section which holds a channel number data and channel rate data corresponding to each of channels on a TDM bus. A write control section performs plane switching of the buffer on a write side in a switching rate in accordance with the channel rate and writes a data on the TDM bus in a corresponding area of the switched buffer in accordance with the channel number data. A packet control section holds a relation data between a frame address on a packet reception side and the channel number. A read control section performs a plane switching of the buffer on a read side in accordance with the channel rate and reads a data by a predetermined amount from the corresponding area of the buffer in accordance with the channel number.

Also, a time divisional multiplexing data packet converting circuit is described in Japanese Laid Open Patent Application (JP-A-Heisei 3-109841). In this reference, the time divisional multiplexing data packet converting circuit is composed of a time divisional multiplexing data/packet converting section for reading by a predetermined amount a time divisional data which is written in a first data storage means for every channel in accordance with information indicative of a relation between each of time slots and a channel number to form a packet, and a packet/time divisional data converting section for reading a data of an inputted packet by a predetermined amount which is written in a second data storage means for every channel to form the time divisional multiplexing data in accordance with the relation between each of time slots and a channel number. In this case, a first channel rewriting means rewrites channel numbers having the same destination and the same rate, which are written in a first data storage means, into a same channel number. A second channel number rewriting means rewrites the same channel number which is read out from a second data storage means into an original channel number.

Also, a speech packet communication apparatus is described in Japanese Laid Open Patent Application (JP-A-Heisei 4-348636). In this reference, a speech present state of each of channels from a PBX is detected by a CODEC section. A block discard control section has a traffic calculating function and a discard function. In the traffic calculating function, a transmission amount which is allowed to be transmitted to a time divisional multiplexing unit is calculated based on the number of channels of the speech present state. Also, in the discard function, the determination of discarding and execution of the discarding are performed in accordance with a discarding algorithm defined based on the traffic calculating result. Thus, accumulation of data in a transmission buffer is prevent. As a result, the increase of delay time is prevented.

Also, a packet sending system is described in Japanese Laid Open Patent Application (JP-A-Heisei 7-226773). In this reference, a priority flag checking section checks whether or not a priority flag is present in a secondary header of a packet from a buffer and outputs the checking result. A release timing generating section generates a release timing signal when time-out is detected based on a reference time signal from a time generating section or when a priority flag detection signal is inputted. A multiplexing section multiplexes packets inputted from the buffer via the priority flag checking section. Also, the multiplexing section adds a header having a fixed length to form a frame of a fixed length. The multiplexing section forms a frame of the fixed length in which a fill packet is filled in an empty area of a data field, immediately when the release timing signal is inputted during the multiplexing. Thus, the delay time of a critical packet is shortened.

SUMMARY OF THE INVENTION

The present invention is accomplished to solve the above problems. Therefore, an object of the present invention is to provide a packet multiplexing apparatus in which increase of multiplexing delay can be suppressed without degradation of a transmission efficiency.

Another object of the present invention is to provide a method of multiplexing packets.

In order to achieve an aspect of the present invention, a packet multiplexing apparatus includes at least one high transmission rate data memory for accumulating high transmission rate data, and at least one low transmission rate data memory for accumulating low transmission rate data. A control section determines whether an accumulation quantity of the high transmission rate data reaches a first predetermined value, and issues a transmission instruction when it is determined that the accumulation quantity of the high transmission rate data reaches the first predetermined value. A multiplexing unit multiplexes the high transmission rate data from the high transmission rate data memory and the low transmission rate data from the low transmission rate data memory in response to the transmission instruction to form a packet.

In this case, the packet multiplexing apparatus may further include an inputting unit for inputting the first predetermined value to the control section.

The control section may determine whether an accumulation quantity of the low transmission rate data reaches a second predetermined value, and may issue the transmission instruction when it is determined that the accumulation quantity of the low transmission rate data reaches the second predetermined value. In this case, the packet multiplexing apparatus may further include an inputting unit for inputting the first and second predetermined values to the control section.

The packet is a packet of a fixed data length.

In order to achieve another aspect of a packet multiplexing apparatus include at least one high transmission rate data memory for accumulating high transmission rate data, and at least one low transmission rate data memory for accumulating low transmission rate data. The control section determines whether a ratio of an accumulation quantity of the high transmission rate data and an accumulation quantity of the low transmission rate data reaches a predetermined value, and issues a transmission instruction when it is determined that the ratio reaches the predetermined value. A multiplexing unit multiplexes the high transmission rate data from the high transmission rate data memory and the low transmission rate data from the low transmission rate data memory in response to the transmission instruction to form a packet.

In this case, the packet may be a packet of a fixed data length, and the packet multiplexing apparatus may further include an inputting unit for inputting the predetermined value to the control section.

In order to achieve still another aspect of the present invention, a method of forming a packet in a packet multiplexing apparatus, includes the steps of:

accumulating high transmission rate data in a high transmission rate data memory;

accumulating low transmission rate data in a low transmission rate data memory;

issuing a transmission instruction based on an accumulation quantity of the high transmission rate data and an accumulation quantity of the low transmission rate data; and multiplexing the high transmission rate data from the high transmission rate data memory and the low transmission rate data from the low transmission rate data memory in response to the transmission instruction to form a packet.

In this case, the issuing step may include determining whether the accumulation quantity of the high transmission rate data reaches a first predetermined value, and issuing the transmission instruction when it is determined that the accumulation quantity of the high transmission rate data reaches the first predetermined value. In this case, the first predetermined value is desirably inputted by a user.

Instead, the issuing step may include determining whether the accumulation quantity of the low transmission rate data reaches a second predetermined value, and issuing the transmission instruction when it is determined that the accumulation quantity of the low transmission rate data reaches the second predetermined value. In this case, the second predetermined value is desirably inputted by a user.

Alternatively, the issuing step may include determining whether a ratio of an accumulation quantity of the high transmission rate data and an accumulation quantity of the low transmission rate data reaches a third predetermined value, and issuing a transmission instruction when it is determined that the ratio reaches the third predetermined value. In this case, the third predetermined value is desirably inputted by a user.

DESCRIPTION OF THE PREFERRED EMBODIMENTS

Next, a packet multiplexing apparatus of the present invention will be described with reference to the attached drawing.

Figure 3:
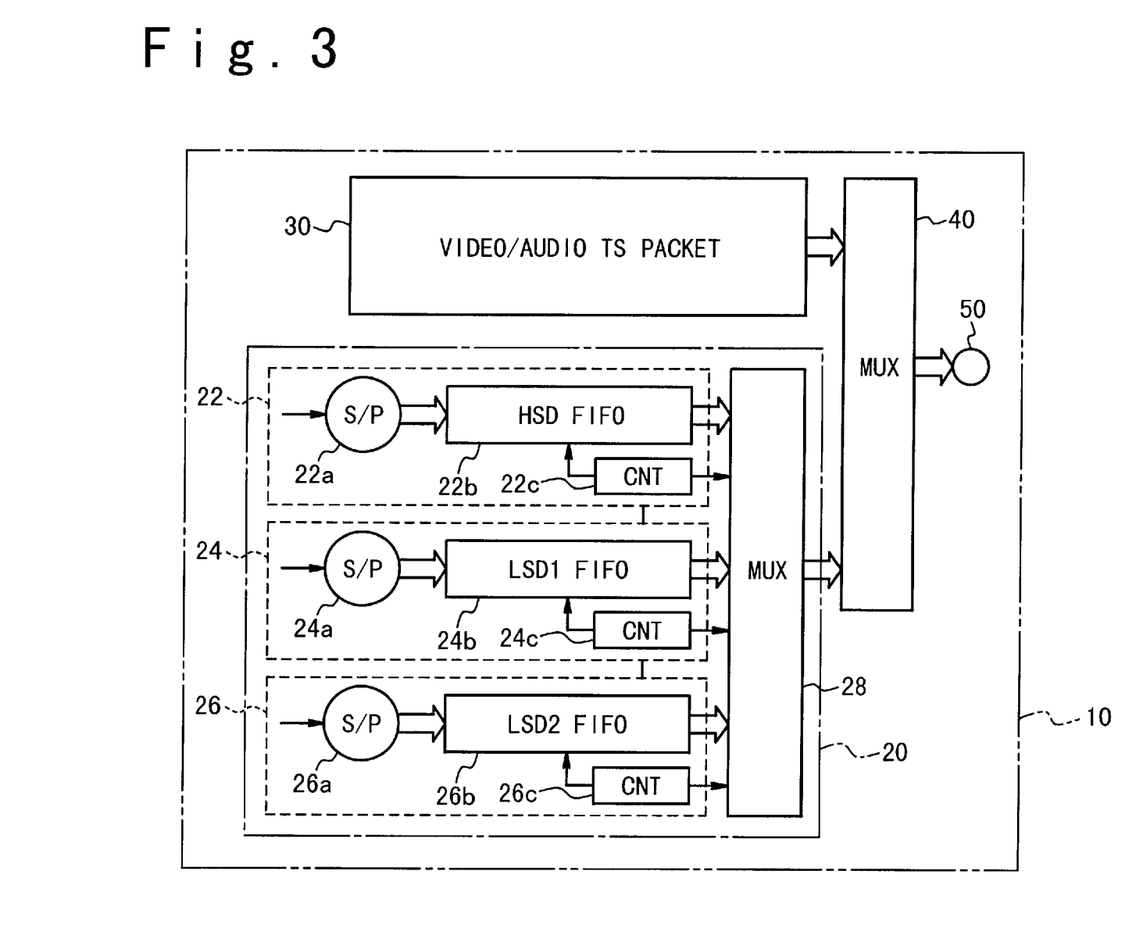
FIG. 3 is a block diagram illustrating the structure of a packet multiplexing apparatus according to a first embodiment of the present invention.

FIG. 3 shows the structure of the packet multiplexing apparatus according to the first embodiment of the present invention. Referring to FIG. 3, the packet multiplexing apparatus 10 is composed of a data multiplexing block 20, a multiplexing block (VIDEO/AUDIO_TS_Packet) 30, a multiplexing section (MUX) 40 and an output terminal 50. The data multiplexing block 20 multiplexes a high transmission rate general-purpose data (HSD data) and a low transmission rate general-purpose data (LSD data) to form a TS packet. The multiplexing block 30 multiplexes an MPEG2Video data and an MPEG1Audio data to form a TS packet. The multiplexing section 40 performs time divisional multiplexing to the TS packets which are formed by the data multiplexing block and the multiplexing block 30. The output terminal 50 sends out the time divisional multiplexed packets to a network. By the above structure, the TS packets in which the HSD data and the LSD data are multiplexed and the TS packets in which the MPEG2Video data and the MPEG1Audio data are multiplexed are subjected to the time divisional multiplexing and are sent out on the network.

The data multiplexing block 20 is composed of a high transmission rate general-purpose data section 22, low transmission rate general-purpose data sections 24 and 26 and a data multiplexing section (MUX) 28. The high transmission rate general-purpose data section 22 accumulates the HSD data to send out at a predetermined time. The low transmission rate general-purpose data sections 24 and 26 accumulate the LSD data to send out at the same time as the above HSD data is sent out. The data multiplexing section (MUX) 28 multiplexes the HSD data and the LSD data into a TS packet. By the structure of the data multiplexing block 20, the HSD data and the LSD data are multiplexed to form the TS packet which is sent out.

The high-speed general-purpose data section 22 is composed of a serial-parallel conversion unit (S/P conversion unit) 22a, a multiplexing memory (HSD_FIFO) 22b, and a control unit (CNT) 22c. The serial-parallel conversion unit 22a converts the serial HSD data inputted to a data port into the parallel HSD data. The multiplexing memory (HSD_FIFO) 22b accumulates the parallel HSD data outputted from the S/P conversion unit 22a. When the parallel HSD data is accumulated in the multiplexing memory 22b for a first predetermined quantity (HSD_Length), the control unit 22c issues a transmission instruction. The parallel HSD data for the first predetermined quantity is sent out under the control of the control unit (CNT) 22c. By the structure of the high-speed general-purpose data section 22, the serial HSD data inputted from the data port is converted into the parallel HSD data and is accumulated in the multiplexing memory (HSD_FIFO) 22b. Then, the parallel HSD data is sent out at the timing when the parallel HSD data is accumulated to the first predetermined quantity. Also, the parallel HSD data is sent out in response to the transmission instruction issued from any one of the low transmission rate general-purpose data sections.

It should be noted that although the high transmission rate general-purpose data section 22 for 1 channel is provided in this embodiment, the number of channels in the high transmission rate general-purpose data section 22 is limited to 1 channel. It is possible to appropriately increase the number of channels according to necessity.

Thus, the multiplexing memory (HSD_FIFO) 22b for accumulating the parallel HSD data functions as a high transmission rate general-purpose data memory.

On the other hand, each of the low transmission rate general-purpose data sections 24 and 26 is composed of a S/P conversion unit 24a or 26a, a multiplexing memory (LSD_FIFO; LSD1_FIFO or LSD2_FIFO) 24b or 26b, and a control unit (CNT) 24c or 26c. The S/P conversion unit 24a or 26a converts the serial LSD data inputted to a data port into a parallel LSD data. The multiplexing memory (LSD1_FIFO or LSD2_FIFO) 24b or 26b accumulates the parallel LSD data outputted from the S/P conversion unit 24a or 26a. When the parallel LSD data is accumulated in the multiplexing memory 24b or 26b for a second or third predetermined quantity, the control unit (CNT) 24c or 26c issues the transmission instruction. The parallel LSD data for the second or third predetermined quantity is sent out from the multiplexing memory 24b or 26b under the control of the control unit 24c or 26c. Also, the parallel LSD data is sent out from the multiplexing memory 24b or 26b in response to the transmission instruction from the high transmission rate general-purpose data section 22 or the other low transmission rate general-purpose data section 26 or 24.

By the structure of the low transmission rate general-purpose data section 24 or 26, the serial LSD data inputted from the data port is converted into the parallel LSD data and is accumulated in the multiplexing memory (LSD_FIFO) 24b or 26b. Then, the parallel LSD data is outputted from the multiplexing memory 24b or 26b at the time when the parallel HSD data is outputted from the multiplexing memory (HSD_FIFO) 22b.

It should be noted that when the data transmission from one of the multiplexing memories is performed under the control of any one of the control units (CNT) 22c to 26c, this data transmission operation is detected by other control units to perform the data transmission operation at the same time. This is because the low transmission rate general-purpose data sections 24 and 26 are linked to the high transmission rate general-purpose data section 22. Therefore, when the control unit 22c controls the multiplexing memory 22b to send out the parallel HSD data, the control units 24c and 26c control the multiplexing memories 24b and 26b to send out the parallel LSD data at the same time.

Also, on the contrary, when the control unit 24c or 26c controls the multiplexing memory 24b or 26b to send out the parallel LSD data, the control units 22c and 26c or 24c control the multiplexing memories 22b and 26b or 24b to send out the parallel HSD data at the same time.

It should be noted that although the low transmission rate general-purpose data sections 24 and 26 of 2 channels are provided in this embodiment, the number of low transmission rate general-purpose data sections is not limited to 2 channels. It is possible to appropriately change the number of channels according to the necessity.

Thus, the multiplexing memory (LSD_FIFO) 24b or 26b for accumulating the parallel LSD data functions as a low transmission rate data multiplexing memory.

Figure 4:
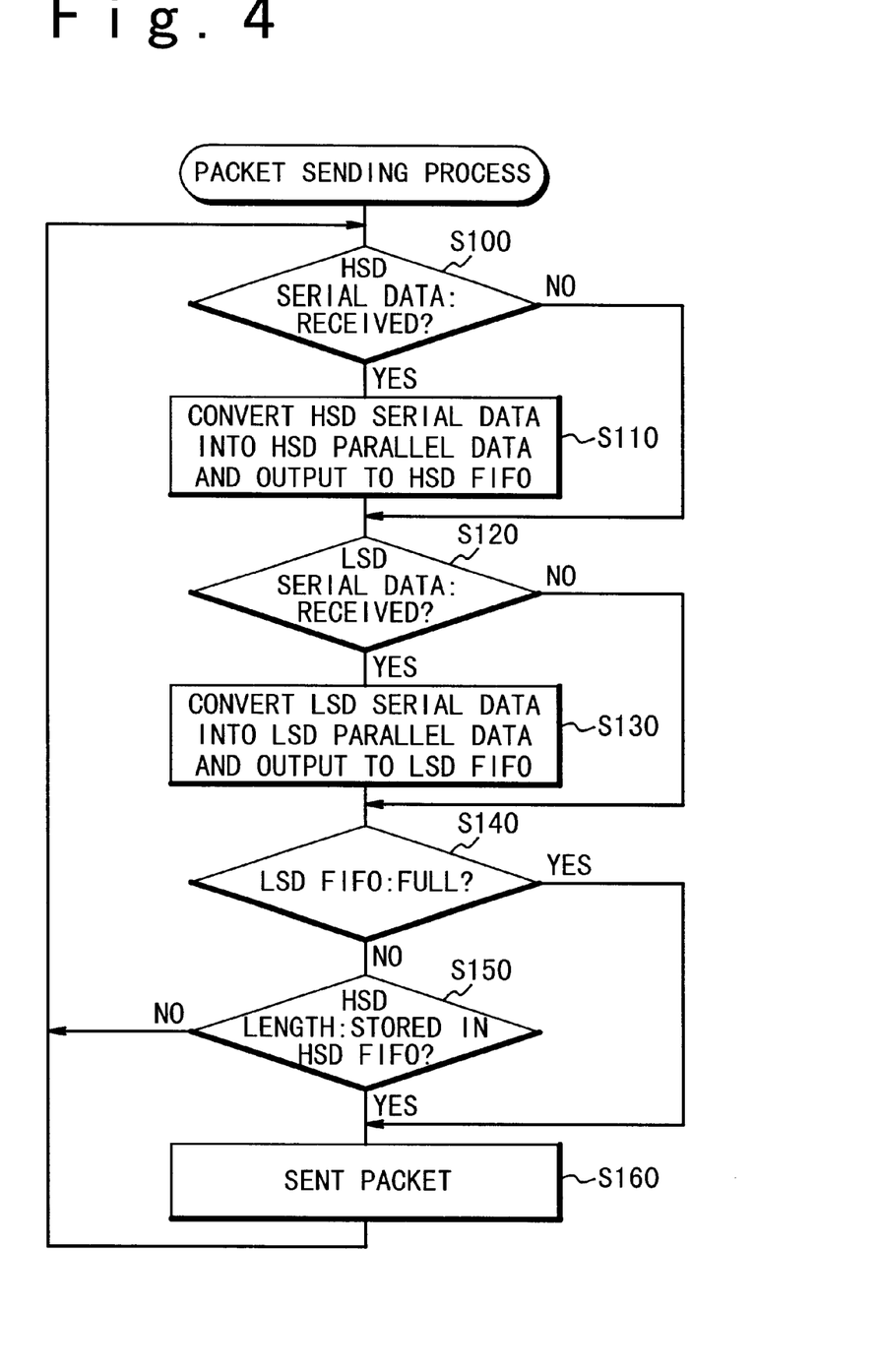
FIG. 4 is a flow chart to describe the procedure of the data sending-out processing in the packet multiplexing apparatus according to the first embodiment of the present invention.

FIG. 4 is a flow chart illustrating the operations of the high transmission rate general-purpose data section 22 and low transmission rate general-purpose data sections 24 and 26 in the embodiment. Referring to FIG. 4, the procedure for sending out all parallel data at the time when the parallel HSD data is accumulated for the first predetermined quantity (HSD_Length) will be described.

When the serial HSD data is inputted to the data port (Step S100), the serial HSD data is taken in and converted into the parallel HSD data by the S/P conversion unit 22a. Then, the parallel HSD data is accumulated in the multiplexing memory 22b (Step S110).

On the other hand, when the serial LSD data is inputted to the data port (Step S120), the serial LSD data is taken in and converted into the parallel LSD data. Then, the parallel LSD data is accumulated in the multiplexing memory 24b or 26b (Step S130).

At this time, it is determined whether the multiplexing memory 24b or 26b is full. When it is determined that the multiplexing memory 24b or 26b is not full (Step S140), it is determined whether the parallel HSD data is accumulated in the multiplexing memory 22b for the first predetermined quantity (HSD_Length). When it is confirmed that the parallel HSD data is not accumulated for the first predetermined quantity (HSD_Length) in the multiplexing memory 22b (Step S150), the control waits for the following data entry.

While this procedure is repeated, when it is determined that either of the multiplexing memories 24b and 26b is full (Step S140), the transmission instruction is issued and the control advances to a step S160. Also, when it is confirmed that the parallel HSD data is accumulated for the first predetermined quantity (HSD_Length) in the multiplexing memory 22b (Step S150), the transmission instruction is issued and the control advances to the step S160. In the step S160, the control units 22c to 26c control the multiplexing memories 22b to 26b such that the parallel HSD data and the parallel LSD data are outputted.

Figure 5:
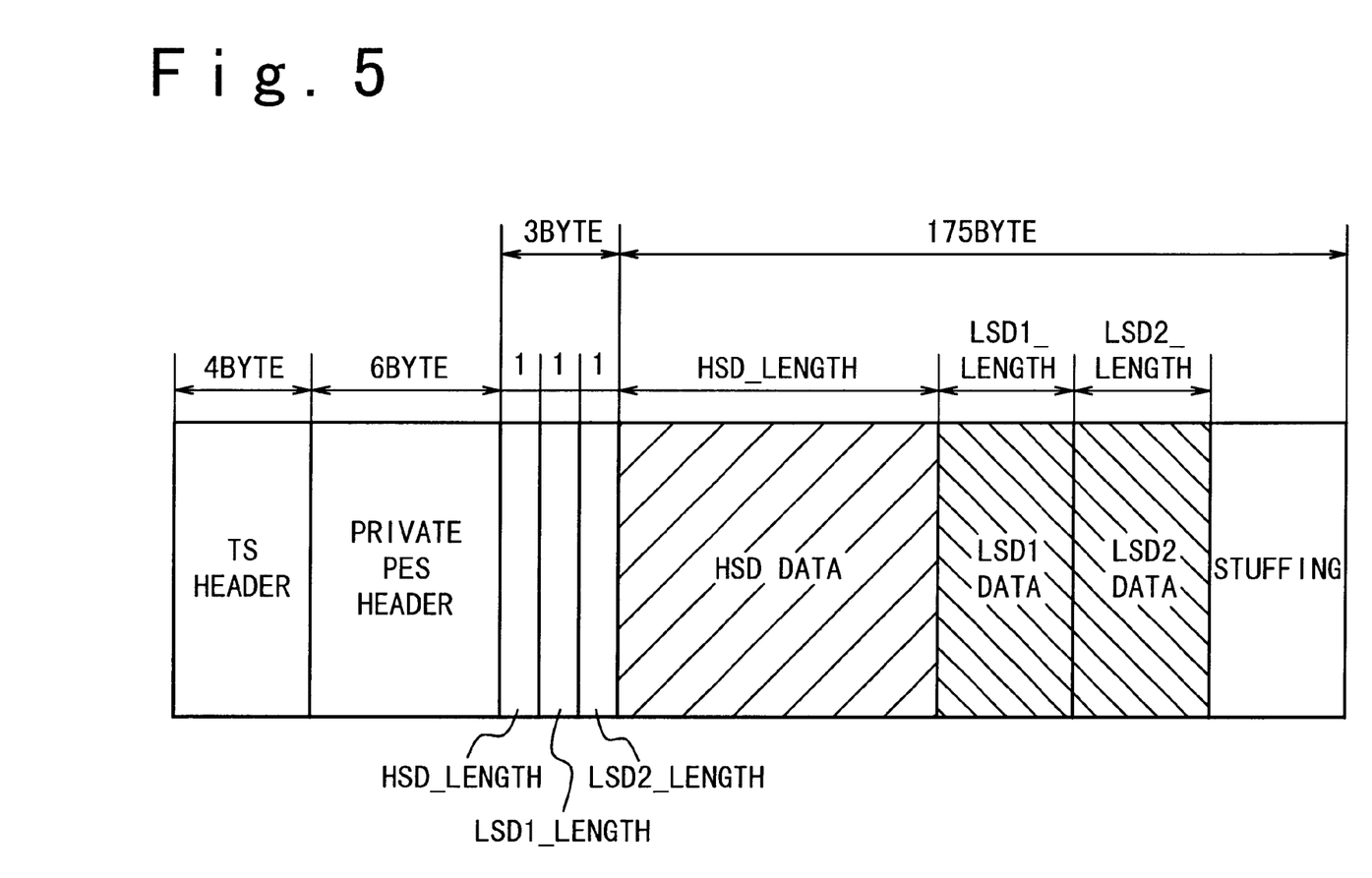
FIG. 5 is a format illustrating the structure of a TS packet used in the packet multiplexing apparatus according to the first embodiment of the present invention.

The multiplexing section MUX 28 multiplexes the parallel HSD data and the parallel LSD data sent out from the multiplexing memories 22b to 26b into a TS packet based on the control of the control units 22c to 26c, as shown in FIG. 5. The TS packet is composed of a TS header to which an identifier indicative of a private PES packet is added, a PES header of the private PES packet, indications (HSD_Length, LSD1_LENGTH AND LSD2_LENGTH) of data lengths of the data which are put on the TS packet, the data which are sent out from the high transmission rate general-purpose data section 22 and the low transmission rate general-purpose data sections 24 and 26, and a stuffing area in which all bits are set to "1".

The TS packet having the above-mentioned structure is formed by the multiplexing section (MUX) 28 and is subjected to the time divisional multiplexing in the multiplexing block (MUX) 40 together with the TS packets formed by the multiplexing block 30.

Each of the above data length indications indicative of the data length of parallel data is set by the user through an operation unit (not shown) connected to each of the control units 22c to 26c. Each data is put on the TS packet in accordance with the data length. At this time, in order to decrease the multiplexing delay which occurs in accompaniment with the generation of the TS packet, the user can set a large data length for the parallel HSD data with the short accumulation time and a short data length for the parallel LSD data with the long accumulation time.

In the step S140 of the above procedure, the determination may be performed as to whether the low transmission rate general-purpose data section 24 or 26 accumulates the parallel LSD data for the second or third predetermined quantity. In this case, the first to third predetermined quantity correspond to the above large data length and short data lengths, respectively.

Also, in order to decrease the multiplexing delay which occurs in accompaniment with the generation of the TS packet, the control units 22c to 26c may control a data ratio of the parallel HSD data and the parallel LSD data in the formation of the TS packet, in addition to the above data length.

Figure 6A:
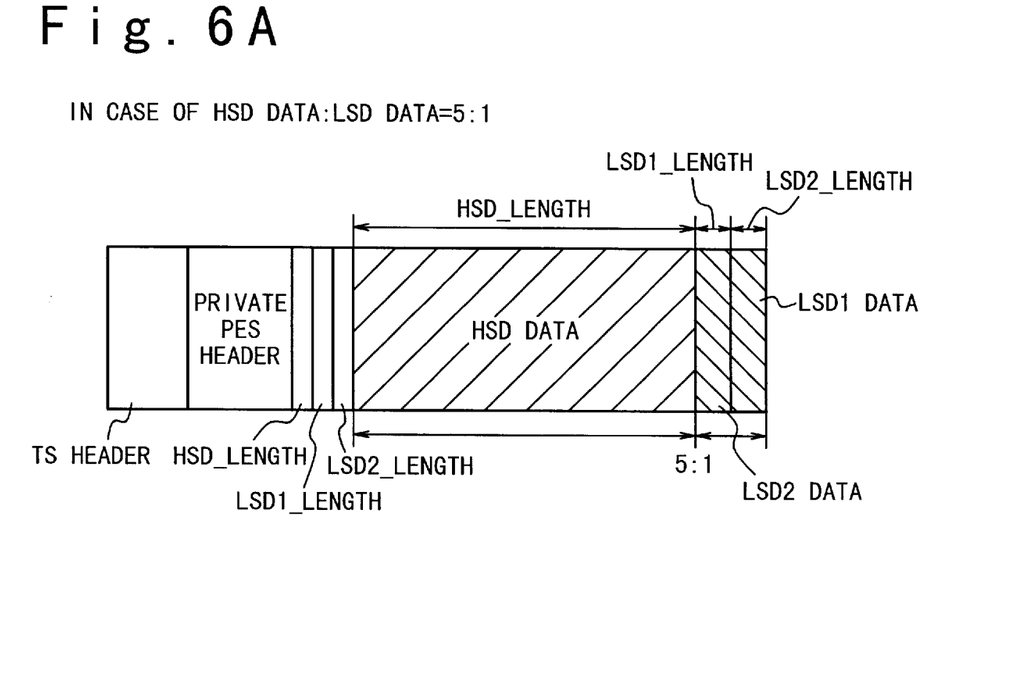
FIGS. 6A and 6B are formats illustrating the structure of TS packets when data ratios are considered.
Figure 6B:
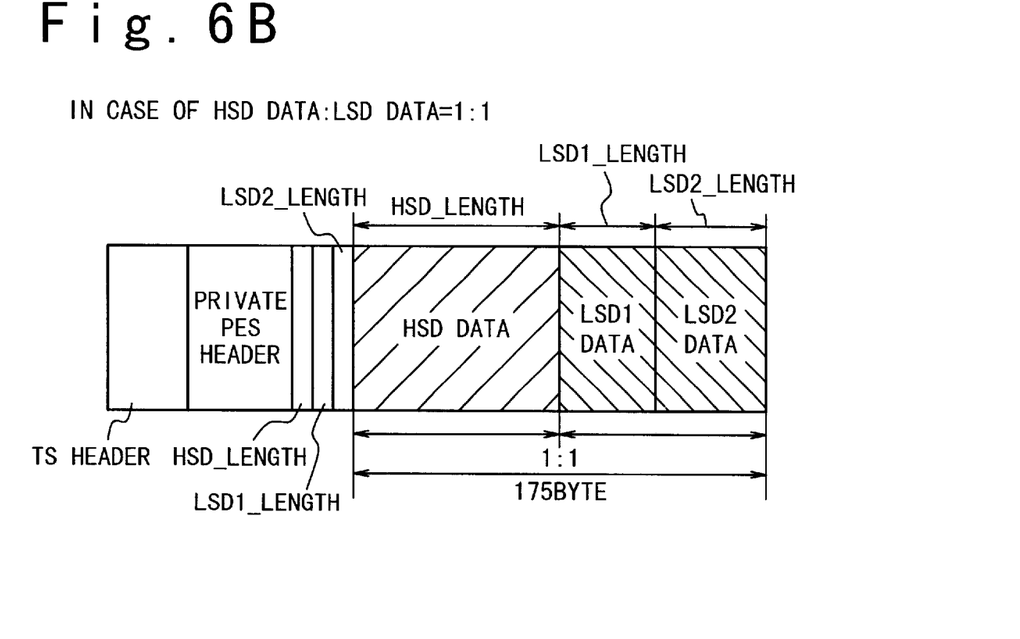

For instance, in case where the area of 175 bytes is provided for the parallel data, when the accumulation quantity of the parallel HSD data increases so that a total of the accumulation quantity of the parallel HSD data and the accumulation quantity of the parallel LSD data reaches 175 bytes, the control units controls the multiplexing memories 22b to 26b such that the parallel data are outputted to the multiplexing section 28. At this time, as shown in FIGS. 6A and 6B, the data ratio of the parallel HSD data and the parallel LSD data sometimes is 5:1, and sometimes is 1:1. However, when the accumulation quantity of the parallel HSD data is increased so that the total data quantity reaches 175 bytes, the parallel data are sent out. Therefore, it becomes possible to decrease the multiplexing delay without the degradation of the transmission efficiency due to the stuffing area.

By the way, in the above first embodiment, the above-mentioned operation is realized by the combination of hard logic circuits. However, the operation may be realized in a software in the second embodiment of the present invention. Therefore, the above-mentioned operation realized by the software which is stored in a ROM will be described with reference to FIG. 7.

Figure 7:
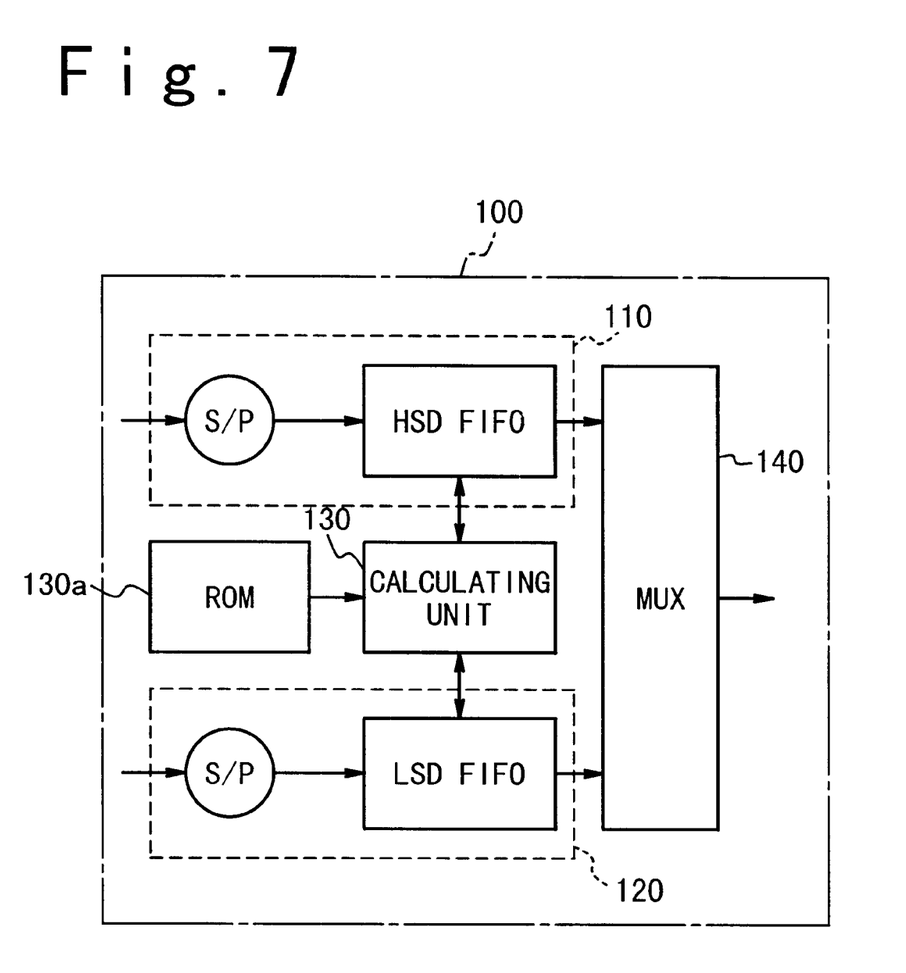
FIG. 7. is a block diagram illustrating the structure of the packet multiplexing apparatus according to a second embodiment of the present invention.

The packet multiplexing apparatus 100 is composed of a high transmission rate general-purpose data section 110, a low transmission rate general-purpose data section 120, and a calculating unit 130, and a multiplexing section 140. The high transmission rate general-purpose data section 110 converts the serial HSD data into the parallel HSD data to store in a multiplexing memory (HSD_FIFO) and then outputs the parallel HSD data at a predetermined time. The low transmission rate general-purpose data section 120 converts the serial LSD data into the parallel LSD data and to store in a multiplexing memory (LSD_FIFO) and then outputs the parallel LSD data at the predetermined time. The calculating unit 130 controls the sending-out of the parallel HSD data from the high transmission rate general-purpose data section 110 and the sending-out of the parallel LSD data from the low transmission rate general-purpose data section 120. The multiplexing section 140 multiplexes the parallel HSD and LSD data to form a TS packet for sending out it. By the above structure of the packet multiplexing apparatus, the parallel HSD data and the parallel LSD data are outputted and multiplexed to form the TS packet.

In this case, the calculating unit 130 is connected to a ROM 130a in which an execution program for the data sending-out processing is stored. When the execution program is started, the procedure in which the data sending-out processing of the high transmission rate general-purpose data section 110 and the low transmission rate general-purpose data section 120 is performed as shown in FIG. 4.

Next, the operation when time divisional multiplexing is performed to the TS packet obtained by multiplexing the parallel HSD data and the parallel LSD data and the TS packet obtained by multiplexing the MPEG2Video data and MPEG1Audio data in the above packet multiplexing apparatus 10 will be described.

When the serial HSD data is inputted to the data port (Step S100), the serial HSD serial data is taken in, and is converted into the parallel HSD data. Then, the parallel HSD data is accumulated in the multiplexing memory (HSD_FIFO) (Step S110).

On the other hand, when the serial LSD data is inputted to the data port (Step S120), the serial LSD data is taken in, and is converted into the parallel LSD data. The parallel LSD data is accumulated in the multiplexing memory (LSD_FIFO) (Step S130). At this time, it is determined whether the multiplexing memory LSD_FIFO) is full (Step S140). If the multiplexing memory (LSD_FIFO) is full, the entire parallel data accumulated in the multiplexing memory (LSD_FIFO) is sent out to the multiplexing section 140. At the same time, all of the parallel HSD data is also sent out from the multiplexing memory (HSD_FIFO) to the multiplexing section 140 (Step S160).

However, if the multiplexing memory (LSD_FIFO) is not full, it is determined whether or not the parallel HSD data is accumulated for the first predetermined quantity (HSD_Length) in the multiplexing memory (HSD_FIFO) (Step S150). If the parallel HSD data is accumulated in the multiplexing memory (HSD_FIFO) for the first predetermined quantity (HSD_Length), the data sending-out operation of the parallel HSD data is performed. At the same time, the parallel LSD data is sent out from the multiplexing memory (LSD_FIFO) (Step S160). If the parallel HSD data is not accumulated for the first predetermined quantity in the multiplexing memory (HSD_FIFO), the control waits for the following data entry.

All of the parallel data sent out from the multiplexing memories (HSD_FIFO and LSD_FIFO) are multiplexed by the multiplexing section 28 to form a TS packet. Then, the TS packet is subjected to time divisional multiplexing by the multiplexing block 40 together with the TS packet which is formed by multiplying the MPEG2Video data and the MPEG1Audio data by the multiplexing block 30. Subsequently, the time divisional multiplexed data is sent out to the network through the output terminal 50.

In this way, the packet multiplexing apparatus 10 monitors the HSD data quantity accumulated in the high transmission rate general-purpose data section 22. When the accumulated HSD data quantity reaches the first predetermined value, the parallel HSD data is sent out. At the same time, the parallel LSD data accumulated in the low transmission rate general-purpose data sections 24 and 26 are sent out. Therefore, the increase of the multiplexing delay due to the LSD data can be suppressed without degradation of the transmission efficiency.

As described above, according to the present invention, the packet multiplexing apparatus can suppress the increase of multiplexing delay without degradation of transmission efficiency.

Also, according to the present invention, because the packet can be transmitted according to the accumulation quantity of the high transmission rate data, the multiplexing delay can be suppressed.

Also, according to the present invention, because it is possible to transmit a packet having a desired data, the degradation of the transmission efficiency and the increase of the multiplexing delay can be prevented.

Also, according to the present invention, because the data ratio of the high transmission rate data and the low transmission rate data can be changed, it is possible to transmit a packet without the increase of the multiplexing delay.

What is claimed is:

1. A packet multiplexing apparatus comprising:
   at least one high transmission rate data memory for accumulating high transmission rate data;
   at least one low transmission rate data memory for accumulating low transmission rate data;
   a control section for determining whether an accumulation quantity of said high transmission rate data reaches a first predetermined value, and for issuing a transmission instruction when it is determined that the accumulation quantity of said high transmission rate data reaches the first predetermined value; and
   a multiplexing unit for multiplexing said high transmission rate data from said high transmission rate data memory and said low transmission rate data from said low transmission rate data memory in response to the transmission instruction to form a packet.

2. A packet multiplexing apparatus according to claim 1, further comprising an inputting unit for inputting the first predetermined value to said control section.

3. A packet multiplexing apparatus comprising:
   at least one high transmission rate data memory for accumulating high transmission rate data;
   at least one low transmission rate data memory for accumulating low transmission rate data;
   a control section for determining both whether an accumulation quantity of said high transmission rate data reaches a first predetermined value and whether an accumulation quantity of said low transmission rate data reaches a second predetermined value, the control section issuing a transmission instruction when it is determined that either the accumulation quantity of said high transmission rate data reaches the first predetermined value or the accumulation quantity of said low transmission rate data reaches the second predetermined value; and
   a multiplexing unit for multiplexing said high transmission rate data from said high transmission rate data memory and said low transmission rate data from said low transmission rate data memory in response to the transmission instruction to form a packet.

4. A packet multiplexing apparatus according to claim 3, further comprising an inputting unit for inputting the first and second predetermined values to said control section.

5. A packet multiplexing apparatus according to claim 1, wherein said packet is a packet of a fixed data length.

6. A packet multiplexing apparatus comprising:
   at least one high transmission rate data memory for accumulating high transmission rate data;
   at least one low transmission rate data memory for accumulating low transmission rate data;
   a control section for determining whether a ratio of an accumulation quantity of said high transmission rate data and an accumulation quantity of said low transmission rate data reaches a predetermined value, and for issuing a transmission instruction when it is determined that the ratio reaches the predetermined value; and
   a multiplexing unit for multiplexing said high transmission rate data from said high transmission rate data memory and said low transmission rate data from said low transmission rate data memory in response to the transmission instruction to form a packet.

7. A packet multiplexing apparatus according to claim 6, further comprising an inputting unit for inputting the predetermined value to said control section.

8. A packet multiplexing apparatus according to claim 6, where in s aid packet is a packet of a fixed data length.

9. A method of forming a packet in a packet multiplexing apparatus, comprising the steps of:
   accumulating high transmission rate data in a high transmission rate data memory;
   accumulating low transmission rate data in a low transmission rate data memory;
   issuing a transmission instruction based on an accumulation quantity of said high transmission rate data and an accumulation quantity of said low transmission rate data; and
   multiplexing said high transmission rate data from said high transmission rate data memory and said low transmission rate data from said low transmission rate data memory in response to the transmission instruction to form a packet.

10. A method of forming a packet in a packet multiplexing apparatus, comprising the steps of:
    accumulating high transmission rate data in a high transmission rate data memory;
    accumulating low transmission rate data in a low transmission rate data memory;
    issuing a transmission instruction based on an accumulation quantity of said high transmission rate data and an accumulation quantity of said low transmission rate data by determining whether the accumulation quantity of said high transmission rate data reaches a first predetermined value, and issuing the transmission instruction when it is determined that the accumulation quantity of said high transmission rate data reaches the first predetermined value; and multiplexing said high transmission rate data from said high transmission rate data memory and said low transmission rate data from said low transmission rate data memory in response to the transmission instruction to form a packet.

11. A method according to claim 10, wherein said issuing step includes inputting the first predetermined value by a user.

12. A method of forming a packet in a packet multiplexing apparatus, comprising the steps of:

accumulating high transmission rate data in a high transmission rate data memory;

accumulating low transmission rate data in a low transmission rate data memory;

issuing a transmission instruction based on an accumulation quantity of said high transmission rate data and an accumulation quantity of said low transmission rate data by determining whether the accumulation quantity of said low transmission rate data reaches a second predetermined value, and issuing the transmission instruction when it is determined that the accumulation quantity of said low transmission rate data reaches the second predetermined value; and multiplexing said high transmission rate data from said high transmission rate data memory and said low transmission rate data from said low transmission rate data memory in response to the transmission instruction to form a packet.

13. A method according to claim 12, wherein said issuing step includes inputting the second predetermined value by a user.

14. A method of forming a packet in a packet multiplexing apparatus, comprising the steps of:

accumulating high transmission rate data in a high transmission rate data memory;

accumulating low transmission rate data in a low transmission rate data memory;

issuing a transmission instruction based on an accumulation quantity of said high transmission rate data and an accumulation quantity of said low transmission rate data by determining whether a ratio of an accumulation quantity of said high transmission rate data and an accumulation quantity of said low transmission rate data reaches a third predetermined value, and issuing a transmission instruction when it is determined that the ratio reaches the third predetermined value; and multiplexing said high transmission rate data from said high transmission rate data memory and said low transmission rate data from said low transmission rate data memory in response to the transmission instruction to form a packets.

15. A method according to claim 14, wherein said issuing step inputting the third predetermined value by a user.

16. A method according to claim 9, wherein said packet is a packet of a fixed data length.

17. A packet multiplexing apparatus comprising:

a audio/video multiplexing unit;

at least one high transmission rate data memory for accumulating high transmission rate, non-audio/video data;

at least one low transmission rate data memory for accumulating low transmission rate, non-audio/video data;

a control section for determining whether an accumulation quantity of said high transmission rate data reaches a first predetermined value, and for issuing a transmission instruction when it is determined that the accumulation quantity of said high transmission rate data reaches the first predetermined value; and a non-audio/video multiplexing unit for multiplexing said high transmission rate data from said high transmission rate data memory and said low transmission rate data from said low transmission rate data memory in response to the transmission instruction to form a packet; and a final multiplexing unit having as inputs an output of the audio/video multiplexing unit and an output of the non-audio/video multiplexing unit.

* * * * *